(12) United States Patent
Ando

(10) Patent No.: US 8,368,807 B2
(45) Date of Patent: Feb. 5, 2013

(54) IMAGING DEVICE

(75) Inventor: Takashi Ando, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 176 days.

(21) Appl. No.: 13/015,022

(22) Filed: Jan. 27, 2011

(65) Prior Publication Data

US 2011/0181743 A1 Jul. 28, 2011

(30) Foreign Application Priority Data

Jan. 28, 2010 (JP) ................................. 2010-017029

(51) Int. Cl.
*H04N 5/225* (2006.01)
*H04N 5/228* (2006.01)
(52) U.S. Cl. ...................... 348/375; 348/373; 348/208.7
(58) Field of Classification Search ............. 348/208.11, 348/208.99, 208.1, 208.2, 208.4, 208.5, 208.7
See application file for complete search history.

(56) References Cited

U.S. PATENT DOCUMENTS

| 2008/0079813 | A1* | 4/2008 | Suzuki | 348/208.11 |
| 2008/0151063 | A1* | 6/2008 | Mogamiya | 348/208.2 |
| 2009/0185796 | A1* | 7/2009 | Tsutsumi et al. | 396/55 |
| 2010/0073495 | A1* | 3/2010 | Huang | 348/208.11 |
| 2010/0110202 | A1* | 5/2010 | Matsutani | 348/208.2 |

FOREIGN PATENT DOCUMENTS

| EP | 1 791 350 A2 | 5/2007 |
| JP | 2007-102062 | 4/2007 |
| JP | 2007-162889 | 6/2007 |
| JP | 2009-170765 | 7/2009 |
| JP | 2010-197612 | 9/2010 |

* cited by examiner

*Primary Examiner* — Tuan Ho
*Assistant Examiner* — Zhenzhen Wu
(74) *Attorney, Agent, or Firm* — Oblon, Spivak, McClelland, Maier & Neustadt, L.L.P.

(57) ABSTRACT

An imaging device having a housed state in which a plurality of optical members of an imaging optical system is housed and a shooting standby state in which at least a part of the optical members is moved on a subject side includes a stage configured to be movable along a plane orthogonal to an optical axis so as to move an imaging element which obtains a subject image by the shooting optical system in the plane, a plurality of optical member holding frames each of which is configured to hold each of the optical members and a lens holding frame driver configured to drive each of the optical member holding frames, the stage includes an engagement hole facing to the shooting optical system, and one of the optical member holding frames includes an engagement projection which is engageable with the engagement hole.

9 Claims, 8 Drawing Sheets

IMAGING DEVICE

PRIORITY CLAIM

The present application is based on and claims priority from Japanese Patent Application No. 2010-017029, filed on Jan. 28, 2010, the disclosure of which is hereby incorporated by reference in its entirety.

BACKGROUND OF THE INVENTION

1. Field of the Invention

The present invention relates to an imaging device such as a digital still camera and a digital video camera (hereinafter, a digital camera) each having a function which corrects camera shake in shooting.

2. Description of the Related Art

As an imaging device in which a subject image is received on an imaging element (for example, a CCD) via a shooting lens system (shooting optical system), and a digital image corresponding to the subject image is produced based on image signals from the imaging element, a digital camera having a function which corrects camera shake in shooting, a so-called camera shake correction function, has recently been developed for practical use.

As such a camera shake correction function, for example, a structure has been introduced, which moves an imaging element (for example, a CCD) in a plane (X-Y plane) vertical to an optical axis direction (Z-axis) of the shooting optical system according to the blurring amount of a subject image caused by camera shake. In this conventional digital camera having the conventional camera shake correction function, the imaging element is mounted on a stage provided in one end of a fixing cylinder which houses a lens barrel on the shooting optical axis. This stage uses the shooting optical axis as the Z-axis direction, and is provided to be movable in the X-Y plane vertical to the Z-axis direction. This stage is moved by a magnetic force generated by a permanent magnet and a coil facing that permanent magnet. In this conventional digital camera, an inclination in the Y-axis direction and an inclination in the X-axis direction are detected by using a camera shake detector, and based on this detection output, power distribution current to the coil is changed, and the imaging element is moved to follow the movement of the subject image by the camera shake, so as to correct the camera shake.

In this conventional digital camera, it is preferable to stop applying current to the coil when the camera shake correction is not performed in terms of decreasing power consumption. However, since the stage is movably provided in the one end of the fixing cylinder, if the positional control (hereinafter, electrical holding) of the stage using the magnetic force of the permanent magnet and the coil is stopped, the stage moves in the movable range, and crushing or impact with the end portion of the movable range may be caused.

Consequently, a camera having a camera shake correction function including a locking mechanism which mechanically holds a stage (imaging element) is proposed (for example, JP2007-162889A). In this camera, the power consumption can be controlled, and the crushing and impact caused by the movement of the stage can be prevented.

However, in the above-described camera having a camera shake correction function, it is necessary to mount the locking mechanism and an actuator for driving the locking mechanism. For this reason, the degree of freedom of the layout of the camera shake correction function and the like is decreased and also the entire costs are increased.

SUMMARY OF THE INVENTION

The present invention has been made in view of the above circumstances, and an object of the present invention is to provide an imaging device which can control the decrease in the freedom of the layout of the camera shake correction function and the like and the increase in the entire costs, and also control the power consumption.

One embodiment of the present invention relates to an imaging device having a housed state in which a plurality of optical members of an imaging optical system is housed by collapsing at least a part of the optical members and a shooting standby state in which at least a part of the optical members is moved on a subject side, comprising: a stage configured to be movable along a plane orthogonal to an optical axis so as to move an imaging element which obtains a subject image by the shooting optical system in the plane; a plurality of optical member holding frames each of which is configured to hold each of the optical members; and a lens holding frame driver configured to drive each of the optical member holding frames, the stage including an engagement hole facing to the shooting optical system, and one of the optical member holding frames, which is moved in an optical axis direction in accordance with transition of the housed state and the shooting standby state, including an engagement projection which is engageable with the engagement hole by the movement in the optical axis direction, wherein the engagement projection and the engagement hole have a positional relationship in which the engagement projection engages with the engagement hole if each of the optical member holding frames is moved into the housed state by the lens holding frame driver and the engagement projection disengages from the engagement hole if the each of the optical member holding frames is moved into the shooting standby state by the lens holding frame driver.

One embodiment of the present invention also relates to an imaging device having a housed state in which a plurality of optical members of an imaging optical system is housed by collapsing at least a part of the optical members and a shooting standby state in which at least a part of the optical members is moved on a subject side, comprising: a stage configured to be movable along a plane orthogonal to an optical axis so as to move an imaging element which obtains a subject image by the shooting optical system in the plane; a plurality of optical member holding frames each of which is configured to hold each of the optical members; and a lens holding frame driver configured to drive each of the optical member holding frames; one of the optical member holding frames, which is moved in an optical axis direction in accordance with transition of the housed state and the shooting standby state, including an engagement hole facing to the stage, and the stage including an engagement projection which is engageable with the engagement hole by the movement of the optical member holding frame including the engagement hole in the optical axis direction, wherein the engagement projection and the engagement hole has a positional relationship in which the engagement projection engages with the engagement hole if each of the optical member holding frames is moved into the housed state by the lens holding frame driver and the engagement projection disengages from the engagement hole if the each of the optical member holding frames is moved into the shooting standby state by the lens holding frame driver.

BRIEF DESCRIPTION OF THE DRAWINGS

The accompanying drawings are included to provide further understanding of the invention, and are incorporated in and constitute a part of this specification. The drawings illustrate an embodiment of the invention and, together with the specification, serve to explain the principle of the invention.

FIG. 8A illustrates a shooting standby state and FIG. 8B illustrates a housed state.

DETAILED DESCRIPTION OF THE PREFERRED EMBODIMENT

Hereinafter, an embodiment of an imaging device will be described with reference to the accompanying drawings.

Embodiment

As one example of an imaging device according to one embodiment of the present invention, a digital camera 10 will be described with reference to FIGS. 1-10. FIG. 8A provides a partially enlarged view illustrating a state in which an engagement projection 55 engages with an engagement hole 36 in a housed state in FIG. 3. FIG. 8B provides a partially enlarged view illustrating a state in which the engagement projection 55 disengages from the engagement hole 36 in a shooting standby state in FIG. 4.

Figure 1:
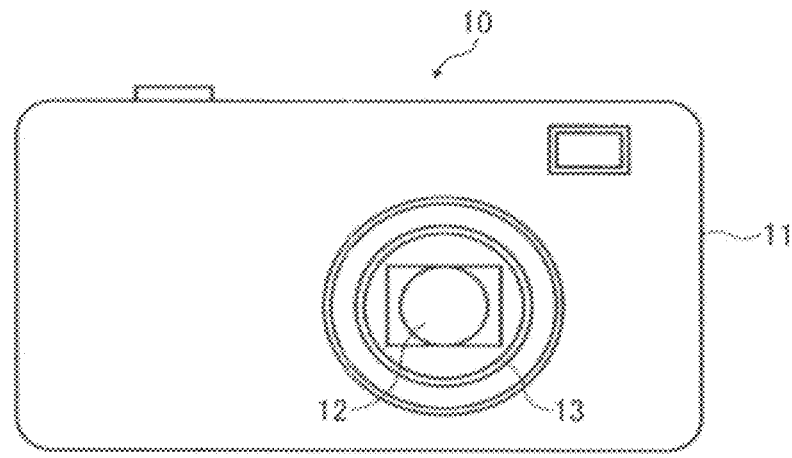
FIG. 1 is a front view illustrating a digital camera 10 as one example of an imaging device according to an embodiment of the present invention.

The digital camera 10 of the present embodiment includes a camera shake correction function which corrects camera shake by moving an imaging element in a plane vertical to the optical axis direction. As illustrated in FIG. 1, the digital camera 10 includes a lens barrel 13 having a part of a shooting optical system 12 on the front face side of a camera body 11. This shooting optical system 12 includes a focus lens 42 (refer to FIGS. 5, 7), a fixing lens, a zoom lens, a shutter unit, an aperture stop (not shown) and the like. The lens barrel 13 is movable between a predetermined collapsed position (refer to a housed state in FIG. 3) and a predetermined drawn position (refer to a shooting standby state in FIG. 4) along the optical axis of the shooting optical system 12 (hereinafter, an optical axis). Hereinafter, the optical axis direction is the Z-axis direction, and the face orthogonal to the Z-axis direction is an X-Y plane.

Figure 2:
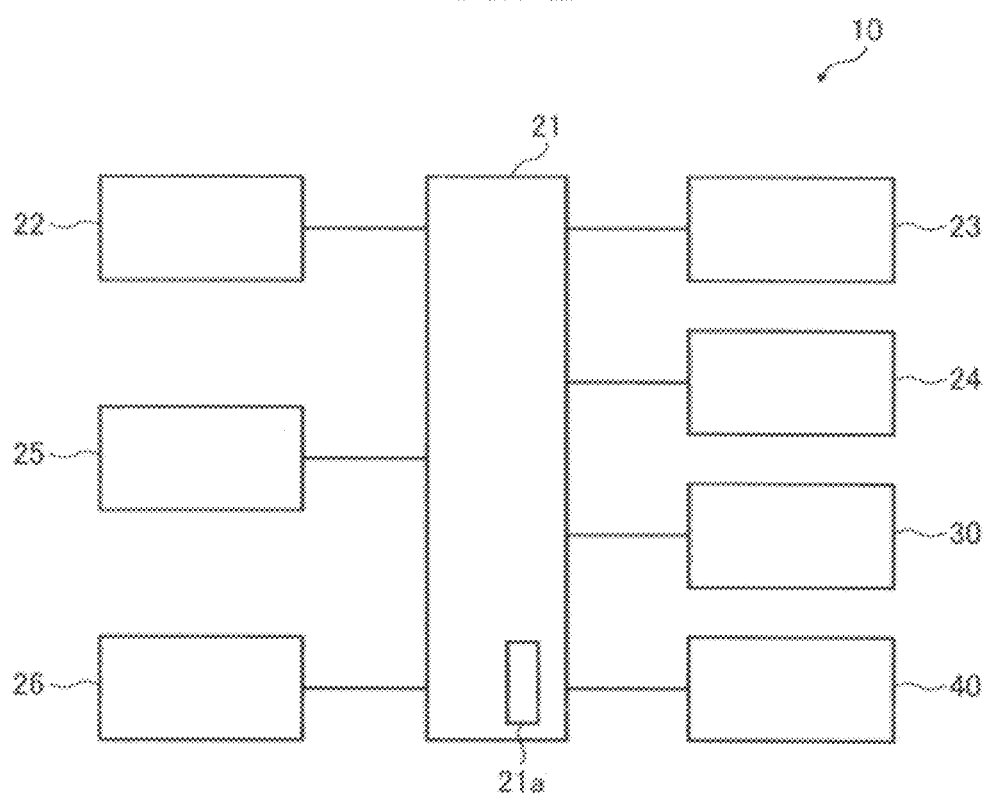
FIG. 2 is a view illustrating a control block in the digital camera 10.

As illustrated in FIG. 2, the digital camera 10 includes a controller 21 which performs overall control of a generation process of image data based on signals from an imaging element 22, driving of a lens barrel driving unit 23, a display 24, a camera shake correction mechanism 30 and a focus lens driving mechanism 40, and the like. This controller 21 obtains an image by the imaging element 22 via the shooting optical system 12 (refer to FIG. 1), and appropriately displays the image on the display 24 provided in the back face side of the camera body 11. Detection signals from a position detector 25 and a camera shake detector 26 are input to the controller 21.

The position detector 25 detects a position of an after-described stage 31. In this embodiment, the position detector 25 comprises a Hall element, and is provided in the stage 31. The camera shake detector 26 detects camera shake generated in the digital camera 10 (camera body 11). In the present embodiment, the camera shake detector 26 comprises a gyro sensor, and is provided in the camera body 11. In addition, the camera shake detector 26 can be constituted by using an acceleration sensor. The lens barrel driving unit 23 moves an optical member holding frame which holds each optical member (not shown) of the shooting optical system 12 (refer to FIG. 1) such that the lens barrel 13 moves into the housed state (refer to FIG. 3) and the shooting standby state (refer to FIG. 4).

Figure 3:
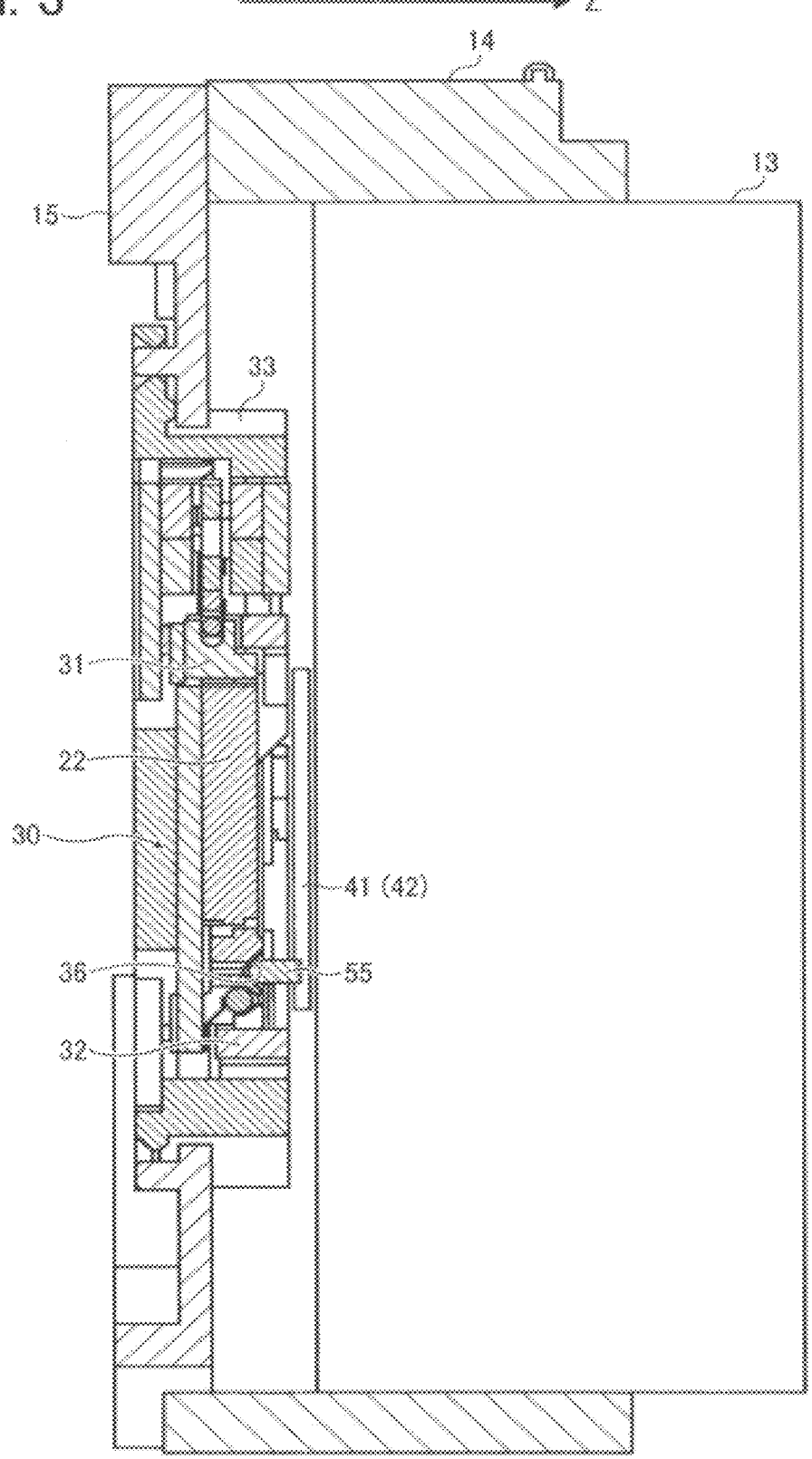
FIG. 3 is a schematic view illustrating a state in which a lens barrel 13 is housed in a collapsed position in a lens barrel housing cylinder 14.

As illustrated in FIG. 3, the lens barrel 13 is provided inside a lens barrel housing cylinder 14. The lens barrel 13 has on the outer circumferential face thereof a helicoidal cam follower (not shown). The lens barrel housing cylinder 14 is integrally formed on the front face side of a base plate 15 disposed in the camera body 11. This lens barrel housing cylinder 14 has on the inner circumferential face thereof a helicoidal cam groove (not shown), and the cam follower formed on the outer circumference of the lens barrel 13 disposed inside the lens barrel housing cylinder 14 engages with the helicoidal cam groove. In the lens barrel housing cylinder 14, by the driving force of the lens barrel driving unit 23 (refer to FIG. 2), the lens barrel 13 (each optical member) moves along the optical axis direction (Z-axis direction) between a predefined collapsed position (refer to FIG. 3) and a predefined shooting standby position (refer to FIG. 4).

In the lens barrel housing cylinder 14, the focus lens 42 is held in a focus lens holding frame 41 to be movable along the optical axis direction (Z-axis direction). If the lens barrel 13 is in a predefined collapsed position (refer to FIG. 3), the focus lens 41 (focus lens holding frame 41) is in a predefined collapsed position (refer to FIG. 3). If the lens barrel 13 is in a predefined shooting standby position (refer to FIG. 4), the focus lens 42 (focus lens holding frame 41) is in a predefined shooting standby position (refer to FIG. 4). This focus lens 42 comprises a lens group located on the side closest to the imaging element 22 in the imaging optical system. If the focus lens 42 is in a predefined shooting standby position (refer to FIG. 4), the focus lens 42 can perform focus adjustment by appropriately moving along the Z-axis direction.

The base plate 15 located in the central portion in the lens barrel housing cylinder 14 includes on the surface thereof a stage 31 which holds the imaging element 22 such as a CCD and a camera shake correction mechanism 30 which corrects camera shake by moving the stage 31 (imaging element 22) in a plane (X-Y plane) vertical to the optical axis direction.

(Configuration of Camera Shake Correction Mechanism 30)

Figure 5:
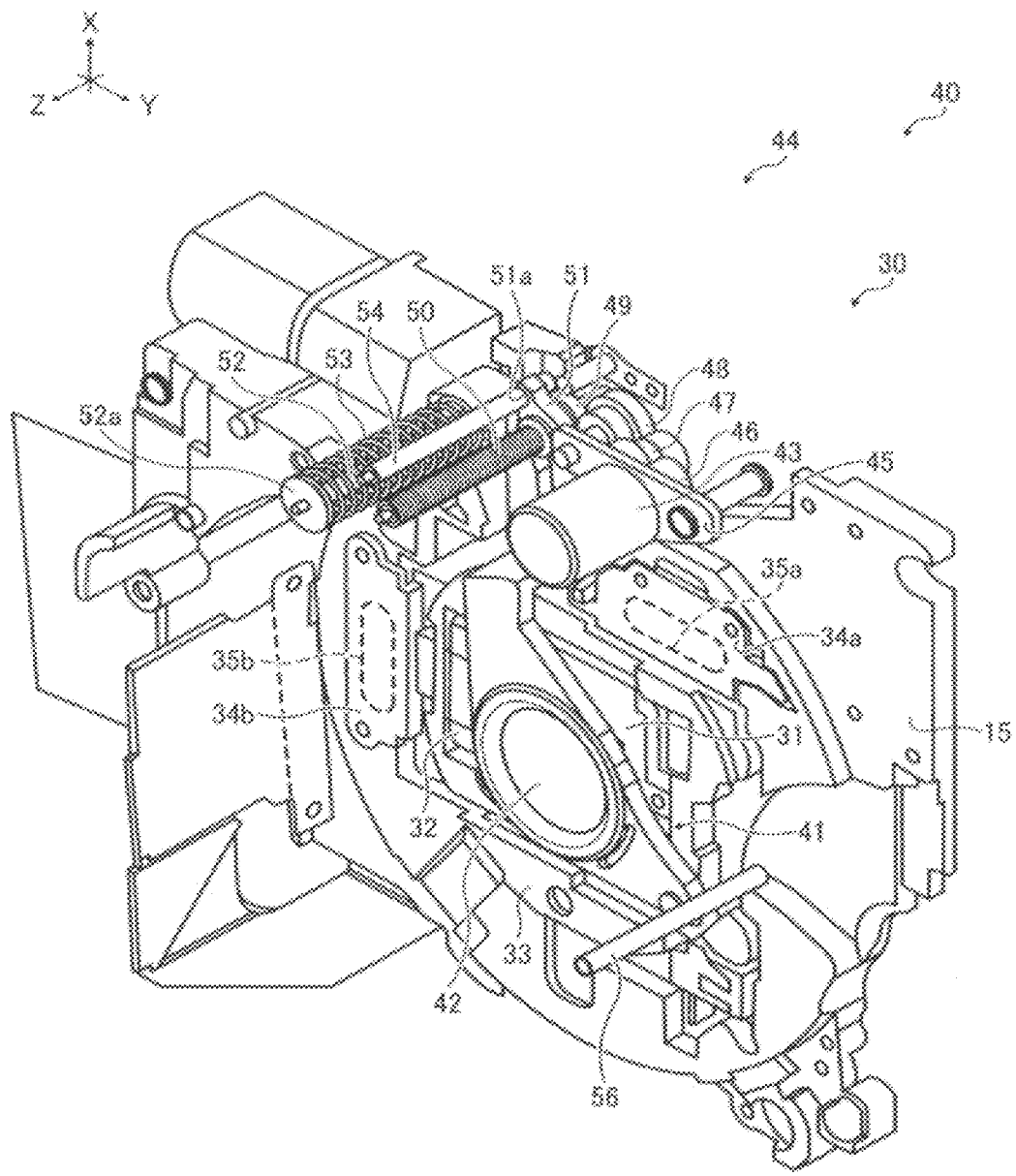
FIG. 5 is a perspective view illustrating a configuration of a focus lens driving mechanism 40 on a base plate 15 of the digital camera 10.
Figure 6:
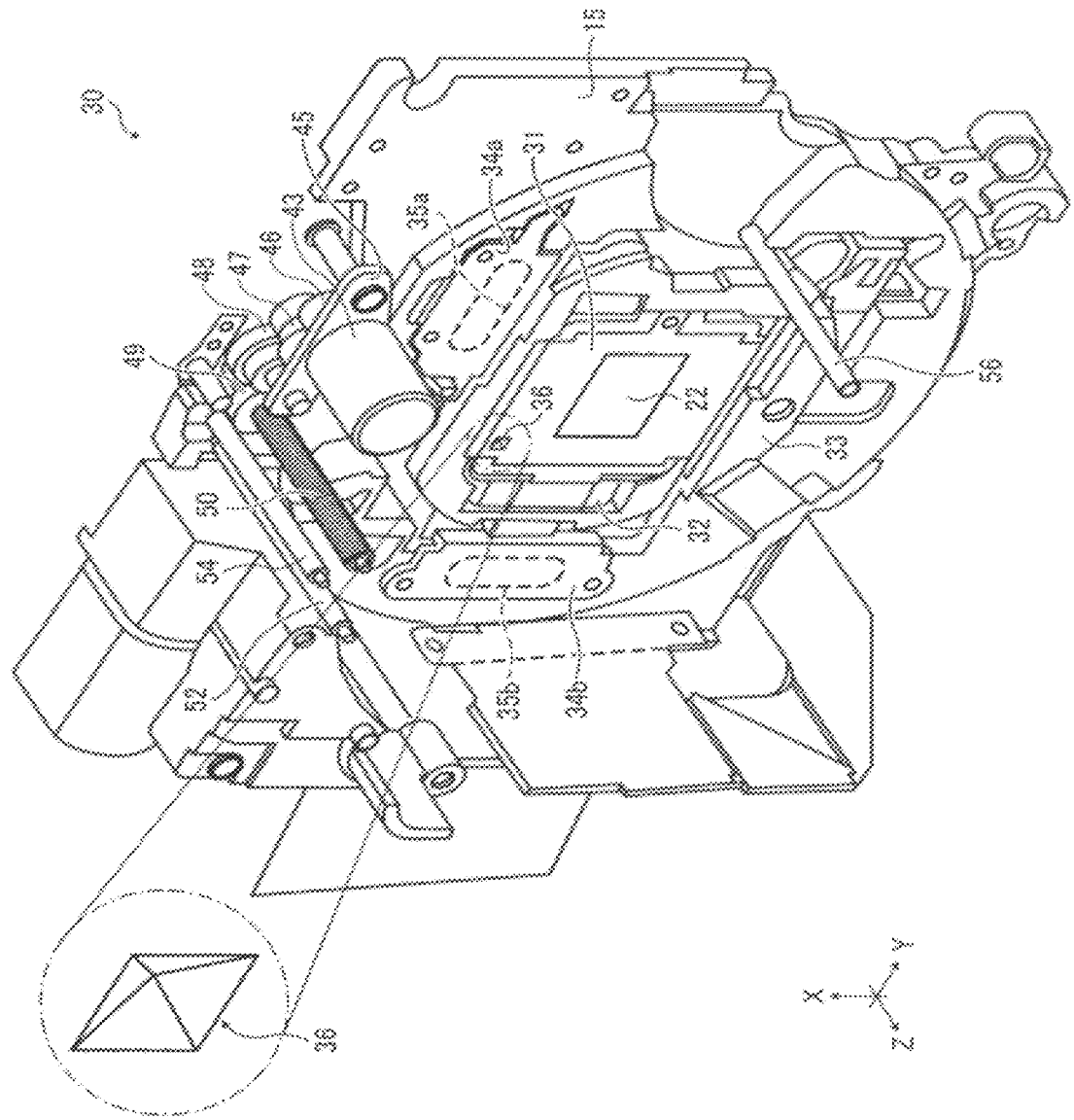
FIG. 6 is a perspective view in which a focus lens holding frame 41 and associated components thereof are omitted from FIG. 5.

The camera shake correction mechanism 30 includes a slide frame 32 which holds the stage 31 in a movable manner as illustrated in FIGS. 5, 6. This slide frame 32 includes a pair of guide bars (not shown) each extending in the X-axis direction (up and down direction in FIGS. 5, 6). The guide bars are provided in both sides of the side frame 32 as viewed in the Y-axis direction (right and left direction in FIGS. 5, 6) of the stage 31. The guide bars slidably penetrate through both side portions of the stage 31 in the Y-axis direction. Accordingly, the stage 31 is held to the slide frame 32 to be movable in the X-axis direction (up and down direction in FIG. 5).

This slide frame 32 is movably held inside a slide holding frame 33 provided on the base plate 15 in the lens barrel housing cylinder 14. This slide holding frame 33 includes a pair of guide bars (not shown) each extending in the Y-axis direction (right and left direction in FIGS. 5, 6). The guide bars are provided on both sides of the slide holding frame 33 as viewed in the X-axis direction (right and left direction in FIGS. 5, 6) of the stage 31. These guide bars slidably penetrate through both side portions of the slide frame 32 in the X-axis direction. Therefore, the slide frame 32 is held in the slide holding frame 33 to be movable in the Y-axis direction. This slide holding frame 33 is fastened to the base plate 15, and is fastened in a predefined position relative to the lens barrel housing cylinder 14. Accordingly, the stage 31, i.e., the imaging element 22 held in the stage 31 is movable along the X-Y plane in a predefined area relative to the slide holding frame 33, i.e., the lens barrel housing cylinder 14 (the optical axis of the shooting optical system 12 provided in the lens barrel housing cylinder 14).

The slide holding frame 33 includes on the surface side thereof yokes 34a, 34b each of which is integrally formed with a permanent magnet (not shown). The yoke 34a is adjacent to the X-axis direction and the yoke 34b is adjacent to the Y-axis direction so as to surround the slide frame 32 as viewed in the X-Y plane. A coil 35a is provided on the side of the back face of the yoke 34a and a coil 35b is provided on the back face of the yoke 34b. The coils 35a, 35b face to the yokes 34a, 34b, respectively, in the Z-axis direction. The coils 35a, 35b are fastened to the not shown extended portions provided in the stage 31 on the back face side of the slide holding frame 33.

In the camera shake correction mechanism 30, the suction repulsion by the magnetic force generated in each coil 35a, 35b and the magnetic force of each yoke 34a, 34b (the permanent magnet integrally formed in each yoke) appropriately acts. By this suction repulsion, the stage 31 can be moved in the X-axis direction and the slide frame 32 can be moved in the Y-axis direction. This stage 31 includes the position detector 25 (refer to FIG. 2) which detects the position of the stage 31 as described above.

In the camera shake correction mechanism 30, the current to be applied to each coil 35a, 35b is controlled according to the camera shake information detected in the above detector 26 (refer to FIG. 2) under the control of the controller 21 (refer to FIG. 2). By this control, the suction repulsion by the magnetic force appropriately acts between the coils 35a, 35b and the yokes 34a, 34b (the permanent magnets integrally formed in the yokes). By this suction repulsion, the stage 31 can be moved in the X-axis direction and the slide frame 32 can be moved in the Y-axis direction, so as to correct camera shake. In this case, in the camera shake correction mechanism 30 (controller 21), the origin position within the X-Y plane in the moving range of the stage 31 is set, the moving target position is set based on the detected camera shake information from the camera shake detector 26 (refer to FIG. 2), the movement direction and the displacement from the origin position to the moving target position are calculated, and the stage 31 is moved in that movement direction at that displacement. Here, in the camera shake correction mechanism 30, since this movement uses the suction repulsion by the magnetic force, servocontrol is conducted based on the positional information from the position detector 25 (refer to FIG. 2) so as to appropriately move to the set moving target position. In addition, a state in which the position of the stage 31 is controlled within the X-Y plane by the suction repulsion by the magnetic force, namely, a state in which the stage 31 is in an arbitrary position within the X-Y plane by the control of the current to be applied to each coil 35a, 35b is hereinafter referred to as electrical holding.

In the camera shake correction mechanism 30, the above-described origin position in the electrical holding conforms to the central position in the area in which the stage 31 is movable on the X-Y plane by the slide frame 32 and the slide holding frame 33 such that the stage 31 can be equally moved regardless of the movement direction on the X-Y plane. In this case, the stage 31 which holds the imaging element 22 is held in the slide frame 32 to be movable in the X-axis direction (up and down direction in FIGS. 5, 6), and the slide frame 32 is held in the slide holding frame 33 to be movable in the Y-axis direction (right and left direction in FIGS. 5, 6), so that the moving range of the stage 31, i.e., the imaging element 22 is limited. For this reason, by conforming the origin position which becomes a standard to the central position of the moving range of the stage 31, i.e., the imaging element 22, the camera shake correction corresponding to any direction on the X-Y plane can be achieved. In addition, in the camera shake correction mechanism 30, in order to control the deterioration in an image by the influence of the aberration and the like in the shooting optical system 12, the above origin position is located on the optical axis (optical axis of shooting optical system 12). Accordingly, in the camera shake correction mechanism 30, the camera shake correction is performed by moving, in the electrically held state, the stage 31, i.e., the imaging element 22 on the X-Y plane so as to cancel the camera shake by using the origin position on the optical axis as a standard. This origin position is stored in a storing section 21a (refer to FIG. 2) provided in the controller 21, and can be appropriately obtained by the controller 21. Therefore, in the digital camera, i.e., the camera shake correction mechanism 30, by controlling the current to be applied to each coil 35a, 35b with the controller 21 according to the data of the origin position stored in the storing section 21a (refer to FIG. 2), in the electrically held state, the stage 31, i.e., the imaging element 22 can be moved to the origin position set on the optical axis, and the existence in the origin position can be maintained.

As illustrated in FIG. 6, the stage 31 has on the surface side thereof (surface side of imaging element 22) an engagement hole 36 with which an engagement projection 55 (refer to, for example, FIG. 3) provided in the back end of an after-described focus lens holding frame 41 disengageably engages. This engagement hole 36 has a square opening end on the surface side (object side) of the stage 31, and has four inclination faces in which an opening area orthogonal to the Z-axis direction is gradually decreased toward the bottom portion (refer to the enlarged portion in FIG. 6). For this reason, the engagement hole 36 faces the shooting optical system 12 (lens barrel 13).

In this embodiment, each inclination face of the engagement hole 36 is inclined at 45 degrees to the Z-axis direction. The size of the opening end of the surface side of the engagement hole 36 is set such that the engagement projection 55 provided in the after-described focus lens holding frame 41 has contact with the above-described inclination faces in a state in which the stage 31, i.e., the imaging element 22 is located in the substantial origin position. More specifically, the opening end of the engagement hole 36 has an opening area larger than a cross-sectional surface as viewed in the position where the engagement projection 55 has contact with the engagement hole 36 (each inclination face). In this case, the state in which the stage 31 is located in the substantial origin position is a state in which the shake of the stage 31 centering on the origin position arising from the fact that the electrical holding is servocontrolled is caused and a state in which the origin position in the electrical holding is shifted from the optical axis by an unexpected occurrence. The focus lens driving mechanism 40 of the focus lens 42 is provided on the object side as viewed in the optical axis direction of the imaging element 22 which is moved on the X-Y plane by the camera shake correction mechanism 30.

(Configuration of Focus Lens Driving Mechanism 40)

As illustrated in FIG. 5, the focus lens driving mechanism 40 moves the focus lens holding frame 41 which holds the focus lens 42 in the Z-axis direction such that the focus lens 42 becomes movable in the Z-axis direction on the optical axis on the surface side (object side) of the imaging element 22. This focus lens driving mechanism 40 includes a driving motor 43 and a reciprocating mechanism 44 which changes the rotation of the driving motor 43 into liner reciprocating motion of the focus lens holding frame 41, as illustrated in FIGS. 5, 7, 8.

The driving of the driving motor 43 is controlled for controlling the movement of the focus lens holding frame 41, and appropriately rotates. In this embodiment, the driving motor 43 comprises a stepping motor. This driving motor 43 is held in a motor holding plate 45 fastened to the base plate 15 (refer to FIG. 5). An output gear 46 (refer to FIG. 7) is fixed to the motor shaft (not shown output shaft) of the driving motor 43, and the reciprocating mechanism 44 is coupled to the output gear 46 (refer to FIG. 7).

The reciprocating mechanism 44 includes two rotation transfer gears 47, 48, a driving gear 49, a lead screw 50, a frame 51 (refer to FIG. 5), a guide shaft 52 and a coil spring 53.

Figure 7:
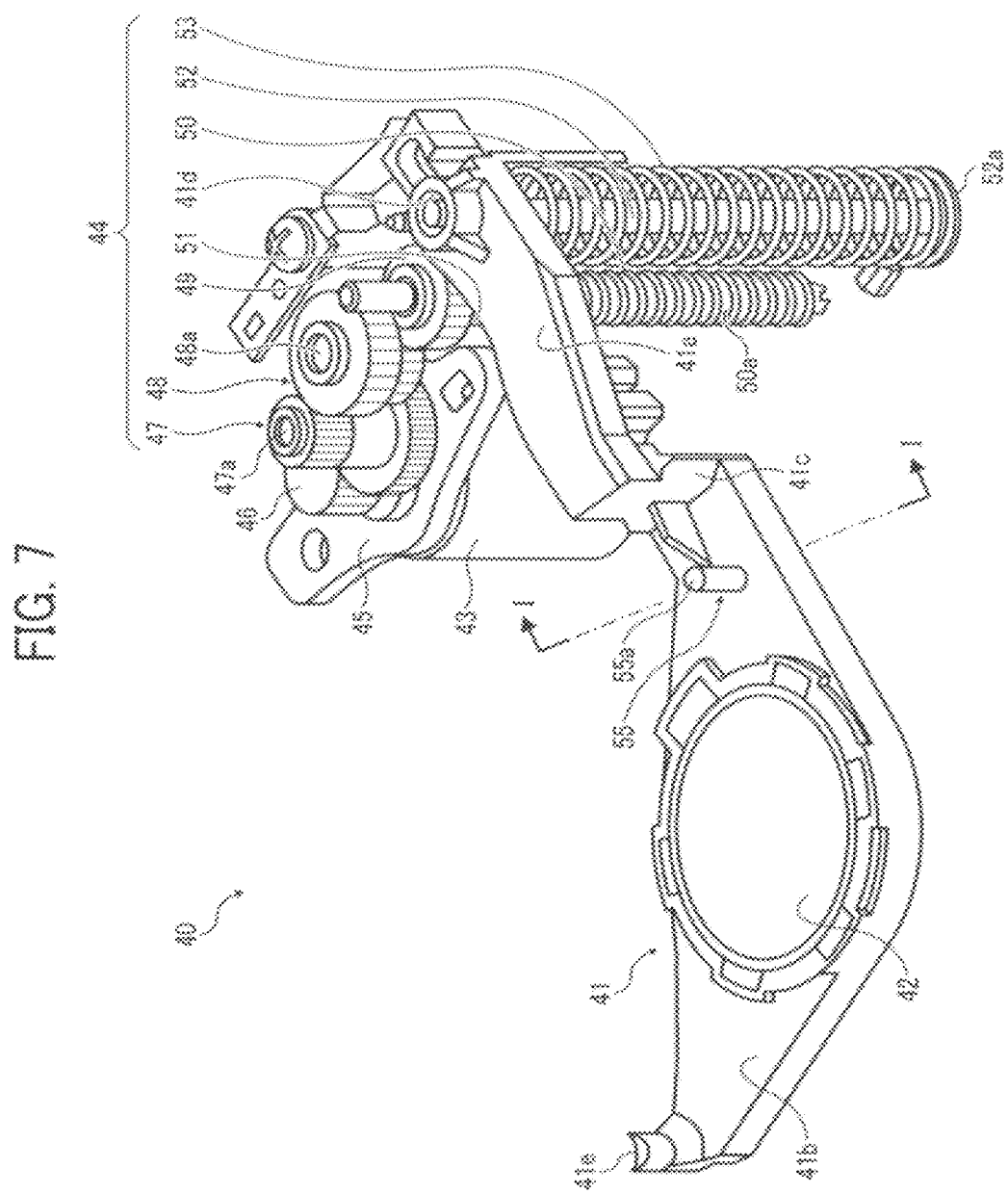
FIG. 7 is a perspective view illustrating a configuration of the focus lens driving mechanism 40 as viewed from the side of the base plate 15.
Figure 8A:
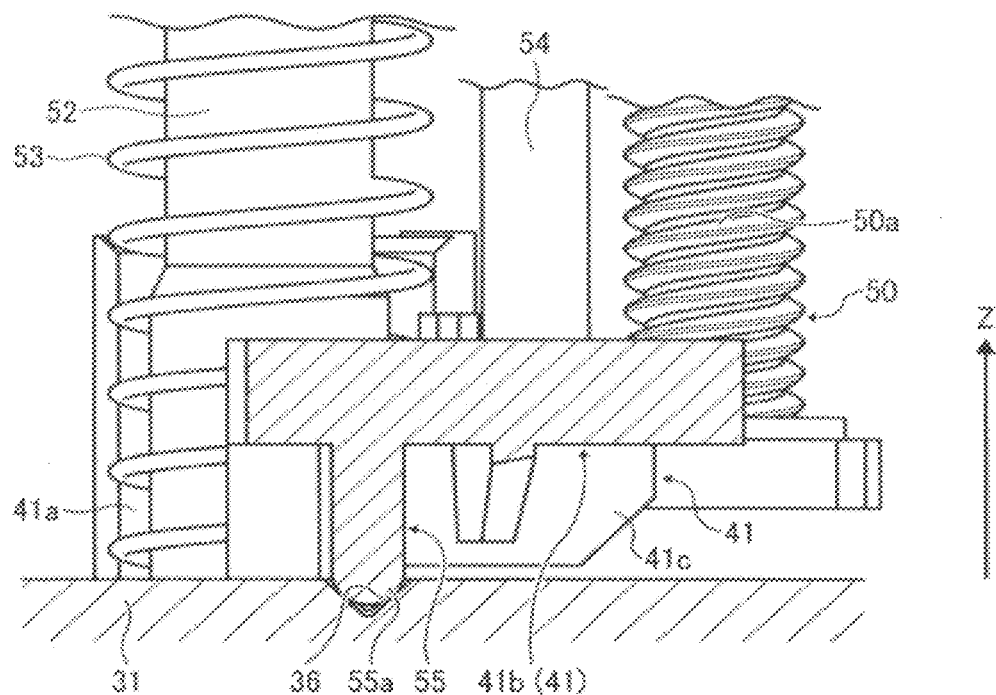
FIGS. 8A, 8B are views each illustrating a schematic sectional view obtained along I-I line in FIG. 7 illustrating the engagement between an engagement projection 55 of the focus lens holding frame 41 and an engagement hole 36 of the stage 31.
Figure 8B:
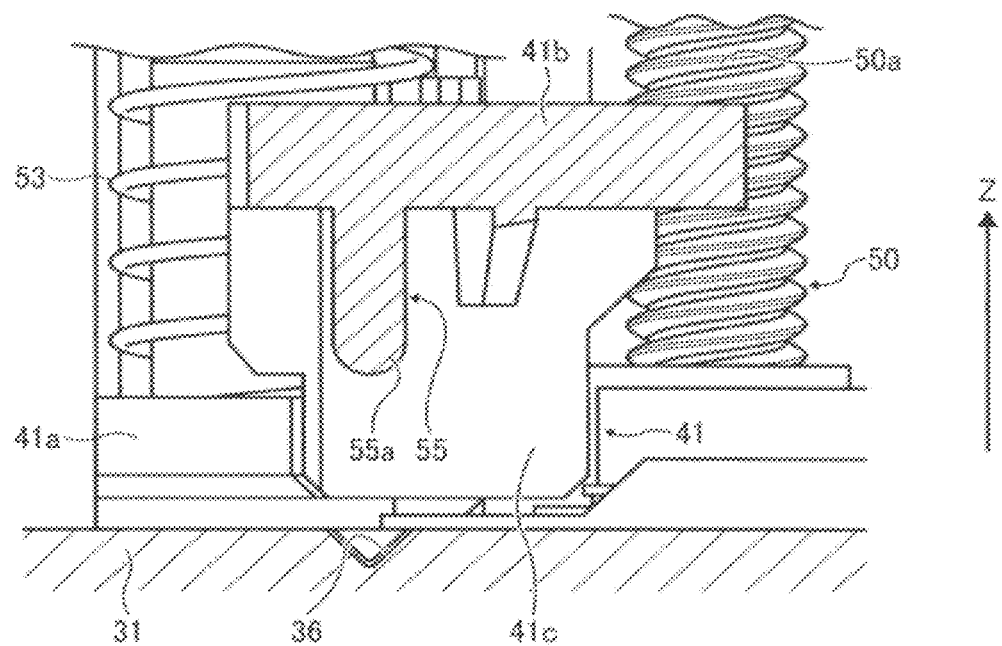

As illustrated in FIG. 7, the rotation transfer gear 47 includes two gear portions one of which has a large diameter and the other of which has a small diameter. The two gear portions have an equal rotation center. The rotation transfer gear 47 is held via a shaft portion 47a provided in the motor holding plate 45. The large diameter gear portion of the rotation transfer gear 47 engages with the output gear 46 (refer to FIG. 7) fixed to the motor shaft (output shaft) of the driving motor 43, and the small diameter gear portion of the rotation transfer gear 47 engages with the large diameter gear portion of the rotation transfer gear 48. This rotating transfer gear 48 includes two gear portions one of which has a large diameter and the other of which has a small diameter. The two gear portions have an equal rotation center. The rotation transfer gear 48 is held via a shaft portion 48a provided in the motor holding plate 45. The small diameter gear portion of the rotation transfer gear 48 engages with the driving gear 49.

The driving gear 49 is fastened to surround the lead screw 50 so that the driving gear 49 rotates together with the lead screw 50. The lead screw 50 is provided in the base plate 15 so as to extend in the Z-axis direction (refer to FIG. 6). The lead screw 50 includes a spiral groove 50a. The spiral groove 50a is formed on the outer circumferential face of the lead screw 50 closer to the leading end side (object side of Z-axis direction) than the driving gear 49. Therefore, by rotating the driving gear 49, the lead screw 50 rotates to the base plate 15.

This lead screw 50 includes the frame 51. This frame 51 includes a through hole (not shown) in which the inner circumferential face thereof is provided with a groove (not shown) which can be threadably mounted on the groove 50a. The groove of the frame 51 is threadably mounted on the groove 50a, and the lead screw 50 penetrates through the through hole of the frame 51. Accordingly, if the lead screw 50 rotates in a rotation prevented state, the frame 51 moves along the lead screw 50 by the guiding function of the groove 50a and the groove. The one end of the frame 51 is coupled to a base end portion 41a of the focus lens holding frame 41. The other end of the frame 51 includes a holding portion 51a which holds an auxiliary guide shaft 54 (refer to FIG. 5) to be movable in the extending direction (Z-axis direction). This auxiliary guide shaft 54 is provided in the base plate 15 to extend in the Z-axis direction so as to stand in line with the lead screw 50 in the adjacent position.

The focus lens holding frame 41 includes the long base end portion 41a in which the one end portion is coupled to the frame 51 and the lens holding frame portion 41b which continues to the base end portion 41a via a step portion 41c. The one end portion of the base end portion 41a is provided with a through hole 41d into which the guide shaft 52 is movably inserted.

The lens holding frame portion 41b holds the focus lens 42 which is one of the optical members constituting the shooting optical system 12. This lens holding frame portion 41b includes in one end portion thereof, i.e., an adjacent position of the step portion 41c an engagement projection 55 and in the other end portion thereof a guide face 41e which is slidable with an auxiliary guide shaft 56 (refer to FIG. 5). This auxiliary guide shaft 56 is provided in the base plate 15 to extend in the Z-axis direction in the position facing to the auxiliary guide shaft 54 via the imaging element 22 (stage 31) as viewed in the X-Y plane.

The engagement projection 55 extends in the Z-axis direction from the back face side of the lens holding frame portion 41b, i.e., the face facing to the stage 31 which holds the imaging element 22. In this embodiment, the engagement projection 55 includes a spherical extended end 55a. The extended end 55a has a size which is engageable with the engagement hole 36 of the stage 31 (refer to FIGS. 3, 8). The engagement projection 55 has a size which engages with the engagement hole 36 of the stage 31 if the focus lens holding frame 41 is in the housed position (refer to FIGS. 3, 8A) and disengages from the engagement hole 36 of the stage 31 if the focus lens holding frame 41 is in the shooting standby position (refer to FIGS. 4, 8B).

The axis line direction of the engagement projection 55 is set in a positional relationship (refer to FIGS. 3, 4) which conforms to the central portion of the engagement hole 36 as viewed in the direction along the X-Y plane, so that the engagement projection 55 appropriately engages with the engagement hole 36 (refer to FIG. 6) of the stage 31 (imaging element 22) which is in the original position in the electrical holding.

The focus lens holding frame 41 can move in the Z-axis direction in a slidable manner if the guide shaft 52 is movably inserted into the through hole 41d of the base end portion 41a. This guide shaft 52 is provided in the base plate 15 (refer to FIG. 5) to extend in the Z-axis direction, so that the guide shaft 52 and the lead screw 50 are arranged in parallel in the adjacent position. The guide shaft 52 includes on the leading end side of the extended direction (the object side of the Z-axis direction) a stopper 52a. The coil spring 53 is provided between the stopper 52a and the base end portion 41a of the focus lens holding frame 41.

This coil spring 53 is provided to surround the circumferential face of the guide shaft 52, and is stopped by the stopper 52a of the leading end of the guide shaft 52. The coil spring 53 presses the base end portion 41a of the focus lens holding frame 41 against the base end side (base plate 15 side) of the guide shaft 52 along the guide shaft 52. Therefore, the base end portion 41a of the focus lens holding frame 41 always comes close to the base plate 15 side in a position according to the position of the frame 51 on the lead screw 50. Thereby, the deterioration in the positional accuracy caused by the backlash of the mechanism for moving the focus lens holding frame 41 which moves along the guide shaft 52 (arising from the backlash of the lead screw 50 and the frame 51 and the like) is prevented.

Next, the operation of the focus lens driving mechanism 40 will be described. In the focus lens driving mechanism 40 (refer to the digital camera 10 in FIG. 1), when the lens barrel 13 is in the collapsed position (the position illustrated in FIG. 3) in the lens barrel housing cylinder 14, the frame 51 is set to be the side closest to the driving gear 49 in the movable range on the lead screw 50 so as to locate the focus lens 42 in the housed position (refer to FIG. 3). In this case, the engagement projection 55 provided in the lens holding frame portion 41b of the focus lens holding frame 41 engages with the engagement hole 36 of the stage 31 (refer to FIGS. 3, 8B). In this engagement state of the engagement hole 36 and the engagement projection 55, from that positional relationship, the stage 31, i.e., the imaging element 22 is in the origin position in the electrical holding.

In the focus lens driving mechanism 40, if the lens barrel 13 moves to the shooting standby position (refer to FIG. 4) from the collapsed position (refer to FIG. 3), the focus lens holding frame 41 (focus lens 42) is moved to the shooting standby position (refer to FIG. 4) which is an appropriate position on the optical axis from the housed position (refer to FIG. 3). The details of this operation are as follows.

In the focus lens driving mechanism 40, the driving motor 43 rotates (hereinafter, normal rotation direction), and the rotation transfer gear 47 engaging with the output gear 46 rotates (hereinafter, reverse rotation direction), the rotation transfer gear 48 engaging with the rotation transfer gear 47 rotates in the normal rotation direction, the driving gear 49 engaging with the rotation transfer gear 48 rotates in the reverse rotation direction, and the lead screw 50 rotates in the reverse rotation direction together with the rotation of the driving gear 49.

In this case, one end of the frame 51 which is threadably mounted on the lead screw 50 is coupled to the base end portion 41a of the focus lens holding frame 41 which is movable along the guide shaft 52, and the other end of the frame 51 movably holds the auxiliary guide shaft 54 (refer to FIG. 5) by the holding portion 51a in the extended direction, and the guide face 41e of the lens holding frame portion 41b of the focus lens holding frame 41 has contact with the auxiliary guide shaft 54 (refer to FIG. 5), so that the frame 51 can be prevented from rotating with the lead screw 50. Consequently, the frame 51 moves from the side closest to the driving gear 49 (base plate 15 side) to the object side in the movable range on the lead screw 50 by the guiding function of the groove 50a and the groove with the rotation of the lead screw 50. As just described, if the frame 51 moves to the object side on the lead screw 50, the focus lens holding frame 41 in which one end of the frame 51 is coupled to the base end portion 41a moves along the guide shaft 52 against the pressing force of the coil spring 53, so that the focus lens 42 held in the lens holding frame portion 41b moves to the object side in the Z-axis direction (refer to FIG. 4). If this movement reaches a predetermined amount, the focus lens 42 moves to the shooting standby position (refer to FIG. 4) corresponding to the lens barrel in the shooting standby position.

Figure 4:
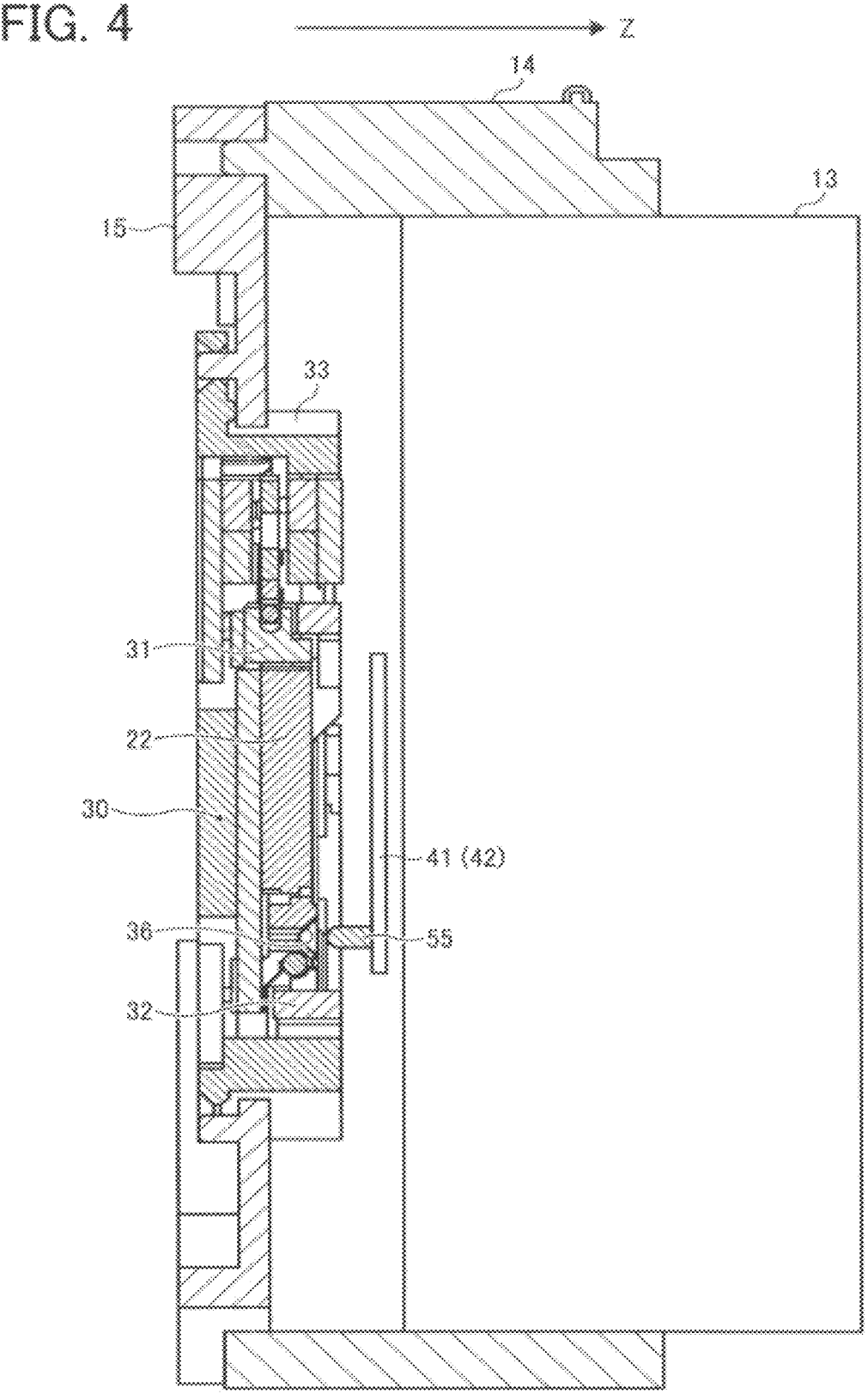
FIG. 4 is a sectional view similar to FIG. 3 illustrating a state in which the lens barrel 13 is drawn from the lens barrel housing cylinder 14.

With the movement of the focus lens holding frame 41, the engagement projection 55 provided in the lens holding frame portion 41b of the focus lens holding frame 41 disengages from the engagement hole 36 of the stage 31 (imaging element 22) in the origin position by the electrical holding (refer to FIGS. 4, 8B). In this case, the movement of the stage 31 (imaging element 22) is not controlled by the engagement projection 55 (engagement with the engagement hole 36), so that the camera shake correction mechanism 30 becomes an operable state. Hereinafter, this state is referred to as a release state.

In the focus lens driving mechanism 40, if the lens barrel 13 is moved to the collapsed position (refer to FIG. 3) from the shooting standby position (refer to FIG. 4), the focus lens holding frame 41 (focus lens 42) is moved to the housed position (refer to FIG. 3) adjacent to the imaging element 22 from the shooting standby position (refer to FIG. 4). The details of this operation are described as follows.

In the focus lens driving mechanism 40, the driving motor 43 rotates in the reverse rotation direction, the rotation transfer gear 47 engaging with the output gear 46 rotates in the normal rotation direction, the rotation transfer gear 48 engaging with the rotation transfer gear 47 rotates in the reverse rotation direction, the driving gear 49 engaging with the rotation transfer gear 48 rotates in the normal rotation direction, and the lead screw 50 rotates in the normal rotation direction together with the rotation of the driving gear 49. Consequently, the frame 51 moves on the lead screw 50 from the shooting standby position (refer to FIG. 4) to the housed position (refer to FIG. 3). With the movement of the frame 51, the focus lens holding frame 41 in which one end is coupled to the base end portion 41a moves on the base plate 15 side (imaging element 22 side) along the guide shaft 52 while receiving the pressing force of the coil spring 53, and the focus lens 42 held in the lens holding frame portion 41b moves on the imaging element 22 side in the Z-axis direction so as to move to the housed position (refer to FIG. 3).

With the movement of the focus lens holding frame 41, the engagement projection 55 provided in the lens holding frame portion 41b of the focus lens holding frame 41 comes close to the engagement hole 36 of the stage 31 (imaging element 22) in the origin position in the electrical holding, and engages with the engagement hole 36 (refer to FIGS. 3, 8B). Consequently, the movement of the stage 31 is controlled by the engagement projection 55 (engagement with the engagement hole 36) in a state in which the center of the imaging element 22 is located on the optical axis. Hereinafter, this state is referred to as a held state, and the held state by the engagement hole 55 is referred to as mechanical holding. Namely, in the digital camera 10, by the lens holding frame driver (lens barrel driving unit 23 and focus lens driving mechanism 40), if the shooting optical system 12 is moved to the housed state (refer to FIG. 3) from the shooting standby state (refer to FIG. 4), the engagement projection 55 engages with the engagement hole 36, so that the movement of the stage 31 (movement along the X-Y plane) to the direction vertical to the optical axis (Z-axis) is mechanically controlled.

(Transition Operation to Shooting Standby State)

Figure 9:
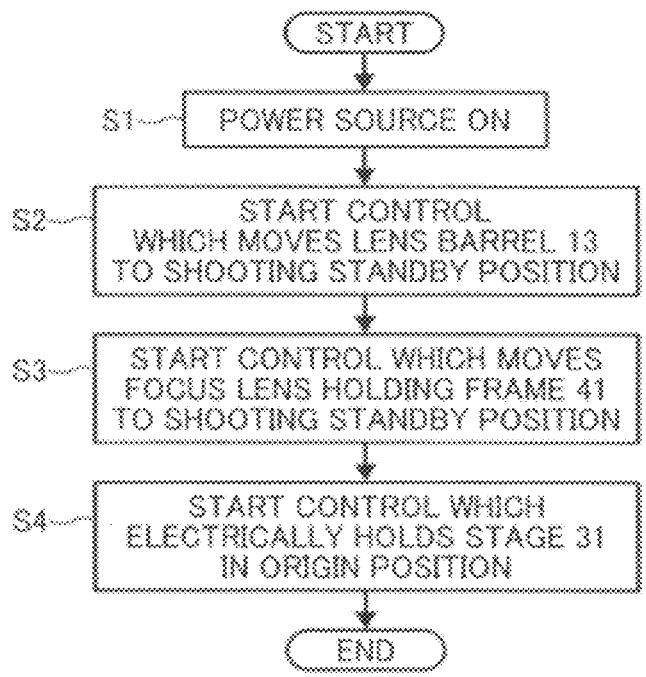
FIG. 9 is a flow chart illustrating one example of a control process of a transition operation to the shooting standby state in a controller 21.

Next, the transition operation to the shooting standby state in the digital camera 10 of the present embodiment will be described. FIG. 9 provides a flow chart illustrating one example of the control process of the operation to the shooting standby state in the controller 21 which controls the transition operation of the digital camera 10. Hereinafter, each step in the flow chart of FIG. 9 which is one example of the control process in the controller 21 in the transition operation to the shooting standby state will be described.

In Step S1, if the power source switch (not shown) of the digital camera 10 is turned on, the flow moves to Step S2 so as to move into the shooting standby state, i.e., from the housed state to the shooting standby state.

In Step S2, since the power source switch (not shown) is turned on in Step S1, the control, which moves the lens barrel 13 to the shooting standby state such that the shooting optical system 12 becomes the shootable state, is started, and the flow moves to Step S3. In Step S2, by controlling the driving of the lens barrel driving unit 23 (refer to FIG. 2), the lens barrel 13 is moved into the shooting standby state (refer to FIG. 4) on the front side (object side) from the collapsed position (refer to FIG. 3) in the lens barrel housing cylinder 14. A predetermined space is thereby obtained between the bottom face side of the lens barrel 13 and the object side (imaging element 22 side) of the stage 31 in the optical axis direction in the lens barrel housing cylinder 14.

In Step S3, after starting the control which moves the lens barrel 13 into the shooting standby state in Step S2, the control which moves the focus lens holding frame 41 into the shooting standby state is started, and the flow moves to Step S4. In Step S3, by controlling the driving of the focus lens driving mechanism 40, namely, by controlling the driving of the driving motor 43 of the focus lens driving mechanism 40, the focus lens holding frame 41 (focus lens 42) is moved to the shooting standby position (refer to FIG. 4) corresponding to the shooting standby position of the lens barrel 13 from the housed position (refer to FIG. 3) corresponding to the collapsed position of the lens barrel 13. Thereby, the shooting optical system 12 becomes a shootable state. In addition, in this embodiment, as a condition in which the focus lens holding frame 41 does not interfere with the lens barrel 13, the operation which moves the focus lens holding frame 41 to the shooting standby position in Step S3 in the process (Step S2) in which the lens barrel 13 is moved to the shooting standby position is performed. This is for controlling the shooting optical system 12 to the shootable state in a short time.

In Step S4, after starting the control which moves the focus lens holding frame 41 into the shooting standby state in Step S3, the control which electrically holds the stage 31 in the origin position is started, and this flow chart is completed. In Step S4, in the electrically held state by the camera shake correction mechanism 30, the control which moves the stage 31 (imaging element 22) to the origin position set on the optical axis and to maintain the stage 31 in the origin position is started. In Step S4, by controlling the current to be applied to each coil 35a, 35b based on the data of the origin position stored in the storing portion 21a, the stage 31 is electrically held in the origin position. In addition, in this embodiment, when moving the focus lens holding frame 41 into the shooting standby state in Step S3, the operation which moves the stage 31 to the origin position in Step S4 is performed before the engagement of the engagement projection 55 to the engagement hole 36, i.e., the mechanical holding is released in Step S3. This is for preventing the generation of the state in which both of the mechanical holding and the electrical holding are released.

By the transition operation to the shooting standby state, the digital camera 10 becomes the shootable state, and the stage 31 (imaging element 22) is moved into the electrically held state by the camera shake correction mechanism 30 from the mechanically held state. In this case, an image obtained under the control of the controller 21 is displayed on the display 24 (refer to FIG. 2), to be a monitoring state. Here, if the camera shake correction switch (not shown) is turned off, the camera shake correction by the camera shake correction mechanism 30 is not performed, and if the camera shake correction switch (not shown) is turned on, the camera shake correction by the camera shake correction mechanism 30 is immediately performed.

(Transition Operation to Housed State)

Figure 10:
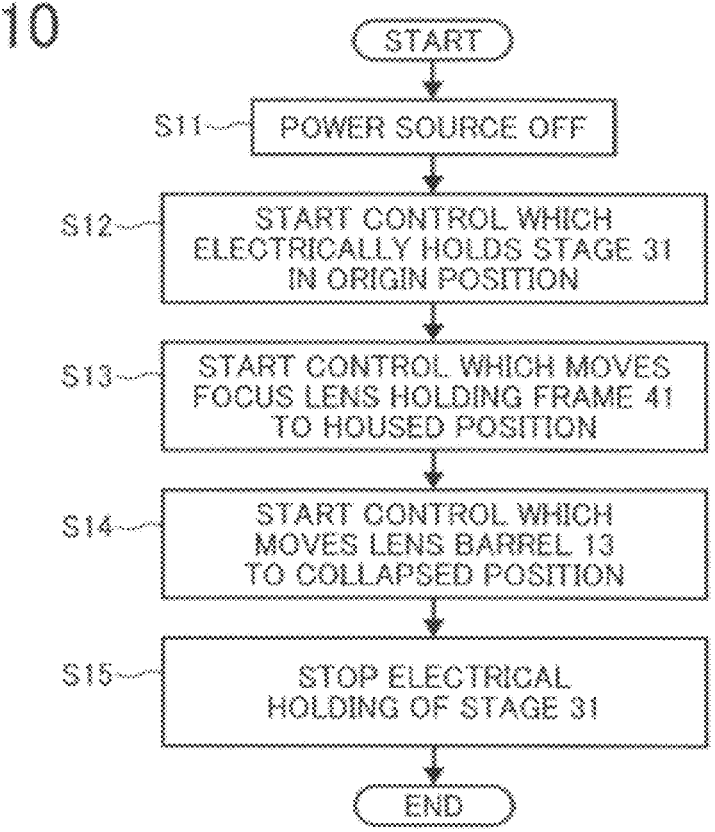
FIG. 10 is a flow chart illustrating one example of a control process of a transition operation from the shooting standby state to the housed state in the controller 21.

Next, the transition operation from the shooting standby state to the housed state in the digital camera 10 in this embodiment will be described. FIG. 10 provides a flow chart illustrating one example of the control process of the transition operation from the shooting standby state to the housed state in the controller 21 which controls the operation of the digital camera 10. Hereinafter, each step of the flow chart in FIG. 10, which is one example of the control process in the controller 21 in the transition operation from the shooting standby state to the housed state, will be described.

In Step S11, if the power source switch (not shown) of the digital camera 10 is turned off, the flow moves to Step S12 which moves into the housed state from the shooting standby state.

In Step S12, since the power source switch (not shown) is turned off in Step S11, the control which electrically holds the stage 31 in the origin position is started, and the flow moves to Step S13. In this step S12, in the electrically held state by the camera shake correction mechanism 30, the control which moves the stage 31 (imaging element 22) to the origin position set on the optical axis and maintains the stage 31 in the origin position is started. Namely, in Step S12, by controlling current to be applied to each coil 35a, 35b based on the data of the origin position stored in the storing portion 21a, the stage 31 is electrically held in the origin position.

In Step S13, the control which moves the focus lens holding frame 41 into the housed state so as to move the shooting optical system 12 to the housed state is started because the control which electrically holds the stage 31 in the origin position is started in Step S12, and the flow moves to Step S14. In this Step S13, by controlling the driving of the driving motor 43 of the focus lens driving mechanism 40, the focus lens holding frame 41 (focus lens 42) is moved to the housed position (refer to FIG. 3) corresponding to the collapsed position of the lens barrel 13 from the shooting standby position (refer to FIG. 4) corresponding to the shooting standby position of the lens barrel 13.

In Step S14, after starting the control which moves the focus lens holding frame 41 to the housed position in Step S13, the control which moves the lens barrel 13 to the collapsed position is started, and the flow moves to Step S15. In this Step S15, by controlling the driving of the lens barrel driving unit 23 (refer to FIG. 2), the lens barrel 13 is moved to the collapsed position (refer to FIG. 3) of the back side (imaging element 22 side) from the shooting standby position (refer to FIG. 4). Thereby, as viewed in the Z-axis direction (optical axis direction) of the stage 31 in the lens barrel housing cylinder 14, the bottom face side of the lens barrel 13 and the focus lens holding frame 41 becomes a closest state, and the shooting optical system 12 becomes the housed state (refer to FIG. 3). In addition, in this embodiment, as a condition in which the lens barrel 13 (bottom face) does not interfere with the focus lens holding frame 41, the operation which moves the lens barrel 13 to the collapsed position in Step S14 in the process (Step S13) which moves the focus lens holding frame 41 to the housed position is performed. This is for moving the shooting optical system 12 into the housed state in a short time.

After starting the control which moves the lens barrel 13 to the collapsed position in Step S14, in Step S15, the electrical holding of the stage 31 is stopped, and this flow chart is completed. In this Step S15, the electrical holding by the camera shake correction mechanism 30 is stopped, namely, the current to be applied to each coil 35a, 35b is stopped. In this case, since the focus lens holding frame 41 is moved into the housed state in Step S13, the stage 31 is in the mechanically held state in which the engagement projection 55 of the focus lens holding frame 41 engages with the engagement hole 36 of the stage 31. For this reason, the stage 31 does not move. In this embodiment, when moving the focus lens holding frame 41 into the housed state in Step S13, if the engagement projection 55 engages with the engagement hole 36 in that process, the electrical holding of the stage 31 is stopped in Step S15. This is for reducing the power consumption while preventing the generation of the state in which both of the mechanical holding and the electrical holding are released.

By the transition operation from the shooting standby state to the housed state, in the digital camera 10, the shooting optical system 12 becomes the housed state. In this case, the image display on the display 24 is stopped.

In the digital camera 10 of the present embodiment, if the focus lens holding frame 41 is moved to the housed position, the engagement projection 55 provided in the lens holding frame portion 41b engages with the engagement hole 36 of the stage 31 (imaging element 22) in the origin position in the electrical holding (refer to FIGS. 3, 8B), so that the stage 31 is mechanically held. If the focus lens holding frame 41 is moved to the shooting standby position, the mechanical holding is released (refer to FIGS. 3, 8B). Accordingly, by simply providing the engagement projection 55 in the focus lens holding frame 41 of the optical member holding frame which is moved by the lens holding frame driver (lens barrel driving unit 23 and focus lens driving mechanism 40), and also providing the engagement hole 36 in the stage 31, the stage 31 can be mechanically held without using a new driving mechanism. As described above, since a new driving mechanism for mechanical holding is not required, increase in power consumption can be prevented and also the thickness of the lens barrel 13 in the optical axis direction can be decreased. In the digital camera which is densely packed by downsizing and reducing a thickness, a structure for mechanical holding (engagement projection 55 and engagement hole 36) can be provided without interfering with circumferential components, wires and the like.

In the digital camera 10 of the present embodiment, since the engagement projection 55 which engages with the engagement hole 36 of the stage 31 is provided in the focus lens holding frame 41 (lens holding frame portion 41b) which holds the focus lens 42 located on the side closest to the imaging element 22 in the shooting optical system 12, in order to mechanically hold the stage 31, the engagement projection 55 projects in the Z-axis direction from the focus lens holding frame 41 (lens holding frame portion 41b), and the engagement hole 36 can be a concave portion which can receive the engagement projection 55 in the stage 31 in the Z-axis direction, and the engagement hole 36 can be a simple structure as a concave portion which can receive the engagement projection 55 in the stage 31 in the Z-axis direction. This is because, in the digital camera 10 in the housed state which does not require the camera shake correction, the focus lens holding frame 41 faces the stage 31 (imaging element 22) by moving in the Z-axis direction in a close position if the focus lens holding frame 41 is moved to the housed position.

In the digital camera 10 of the present embodiment, the engagement hole 36 includes the square opening end on the surface side (object side) of the stage 31, and includes the four inclination faces each of which has an area decreasing toward the bottom portion. Accordingly, even if the position of the engagement projection 55 when the focus lens holding frame 41 (lens holding frame portion 41b) is in the housed position misaligns with the engagement hole 36 in the stage 31 electrically held in the origin position, as viewed in the X-Y plane, the engagement projection 55 can appropriately engage with the engagement hole 36 by moving the engagement projection 55 in the Z-axis direction, so that the appropriate mechanical holding state can be obtained. This is especially effective when the stage 31 is not completely fastened in the origin position arising from the servocontrol because the engagement projection 55 comes close to the Z-axis direction to the engagement hole 36 of the stage 31 (step S12) electrically held in the origin position when the focus lens holding frame 41 moves to the housed position. In addition, in this embodiment, since the extended end 55a of the engagement projection 55 has a substantial spherical shape, so that the positioning function between the engagement projection 55 and the engagement hole 36 can be effectively obtained.

In the digital camera 10 of the present embodiment, when the focus lens holding frame 41 is moved into the shooting standby state (refer to Step S3), the operation which electrically holds the stage 31 in the origin position is performed (refer to Step S4) before the engagement of the engagement projection 55 to the engagement hole 36 is released in Step S3. Accordingly, it is possible to prevent the generation of the state in which both of the mechanical holding and the electrical holding are released with respect to the stage 31, and the imaging element 22 (stage 31) can be stabilized by the electrical holding when the focus lens holding frame 41 is moved into the shooting standby state. In the electrically held state, in the camera shake correction mechanism 30, the servocontrol is performed based on the positional information from the position detector 25 (refer to FIG. 2) so as to appropriately move to the origin position by using suction repulsion by a magnetic force. However, the position of the stage 31 by the mechanical holding is the origin position by the electrical holding. For this reason, the displacement of the stage 31 in accordance with the transition from the mechanical holding to the electrical holding is very small (does not move as a matter of logic) and the time until the lens barrel and the focus lens holding frame 41 become the shooting standby state can be used. Accordingly, the above-described effect can be obtained.

In the digital camera of the present embodiment, if the focus lens holding frame 41 is moved to the housed position, the engagement projection 55 provided in the lens holding frame portion 41b engages with the engagement hole 36 of the stage 31 (imaging element 22) in the origin position in the electrically holding (refer to FIGS. 3, 8B), so that the stage 31 is mechanically held. For this reason, the movement of the stage 31 can be prevented while stopping the electrical holding of the stage 31, and the crushing of the stage 31 and the slide frame 32, and the noise and the impact arising from the crushing between the stage 31 and the slide frame 32 can be prevented without increasing the power consumption.

In the digital camera 10 of the present embodiment, since the position of the mechanically held stage 31 is set to the electrically held origin position, if the digital camera 10 (shooting optical system 12) is moved into the shooting standby state, the camera shake correction by the camera shake correction mechanism 30 can be immediately performed.

In the digital camera 10 of the present embodiment, since the position of the mechanically held stage 31 and the electrically held origin position are set such that the center of the imaging element 22 is located on the optical axis, if the digital camera 10 (shooting optical system 12) is controlled to the shooting standby state, appropriate camera shake correction can be immediately performed by the camera shake correction mechanism 30, and the deterioration in an image can be prevented.

In the digital camera 10 of the present embodiment, since the position of the mechanically held stage 31 and the electrically held origin position conform to the central position in the area in which the stage 31 is movable on the X-Y plane by the slide frame 32 and the slide holding frame 33, if the digital camera 10 (shooting optical system 12) is controlled to the shooting standby state, appropriate camera correction can be immediately performed by the camera shake correction mechanism 30, appropriate camera shake correction can be performed relative to the camera shake in any direction along the X-Y plane, and the deterioration in an image can be prevented.

Therefore, in the digital camera 10 of the present embodiment, the decrease in the freedom degree of the layout such as a camera shake correction mechanism and the increase in the entire costs can be prevented, and also the power consumption can be controlled.

In the present embodiment, the digital camera 10 is described as one example of the imaging device according to the present embodiment. However, the present invention is not limited to the above embodiment as long as it is an imaging device including a housed state and a shooting standby state, a stage which has an imaging element, and is movable along a plane vertical to an optical axis, a plurality of optical member holding frames which holds optical members of a shooting optical system, respectively, a lens holding frame driver which drives each optical member holding frame, and a positional relationship in which an engagement hole provided in the stage engages with an engagement projection provided in one of the optical member holding frames which is moved in the optical axis direction in accordance with the transition of the housed state and the shooting standby state if each of the optical member holding frame is moved into the housed state by the leans holding frame driver, and the engagement hole disengages from the engagement projection if each optical member holding frame is moved into the shooting standby state by the lens holding frame driver, or an electronic device having the imaging element.

In the above embodiment, the engagement projection 55 which engages with the engagement hole 36 provided in the stage 31 (imaging element 22) is provided in the focus lens holding frame 41 (lens holding frame portion 41*b*) which holds the focus lens 42 located on the side closest to the imaging element 22 in the shooting optical system 12. However, it is not limited to the above embodiment. As long as the engagement projection 55 engages with the engagement hole 36 by moving in the Z-axis direction in accordance with the movement from the shooting standby position (shooting standby state) to the collapsed position (housed state) in the shooting optical system 12, the engagement projection can be provided in a lens holding frame which holds another lens group or an optical member holding frame which holds another optical member.

In the above embodiment, the engagement hole 36 includes the square opening end on the surface side of the stage 31 (object side), and has four inclination faces in which each of the areas is decreased toward the bottom face. However, as long as the engagement hole 36 engages with the engagement projection 55 which moves in the Z-axis direction in accordance with the movement from the shooting standby state to the housed state in the shooting optical system 12, it is not limited to the above embodiment. However, the engagement hole can adjust a position gap between the fixed projection and the engagement hole as viewed in the X-Y plane when moving from the electrical holding into the mechanical holding, so that it is desirable to obtain the shape in which the opening area orthogonal to the optical axis direction reduces toward the bottom portion as described in the above embodiment. In addition to the above embodiment, the engagement hole 36 can include, for example, a spherical shape and a cone shape as long as it has a multiangular opening end and has an inclination face which conforms to the number of faces.

In the above embodiment, the engagement projection 55 engages with the engagement hole 36 when the stage 31 is electrically held in the origin position provided on the optical axis in the electrical holding, namely, the mechanical holding is performed in the origin position in electrically holding. However, it is not limited to the above embodiment as long as the mechanical holding is performed by the engagement with the engagement hole when the shooting optical system 12 is moved into the housed state.

In the above embodiment, the engagement projection 55 is provided in the focus lens holding frame 41 which holds the focus lens 42 which is one of the optical members of the shooting optical system 12, and the engagement hole 36 is provided in the stage 31. However, it is not limited to the above embodiment. The engagement projection 55 can be provided in the stage 31 and the engagement hole 36 can be provided in the optical member holding frame which holds the optical member of the shooting optical system 12.

In the above-described imaging device, if each of the optical member holding frames is moved to the housed state by the lens holding frame driver, the engagement projection engages with the engagement hole, so that the position of the stage can be fixed (mechanical holding). If each of the optical member holding frames is moved to the shooting standby state by the lens holding frame driver, the engagement projection disengages from the engagement hole, so that the fixation (mechanical holding) of the position of the stage is released. Accordingly, it is not necessary to mount a locking mechanism and an actuator for driving the locking mechanism; thus, the power consumption can be controlled without decreasing the freedom degree of the layout of the camera shake correction mechanism and the like and increasing the entire costs.

In addition to the above configuration, if the optical member holding frame having the engagement projection holds the optical member located on the side closest to the stage as viewed in the optical axis direction in the optical members of the shooting optical system, the optical member holding frame having the engagement projection faces to the stage in the optical axis direction, so that the engagement projection and the engagement hole can be simplified.

In addition to the above configuration, if the optical member which is held in the optical member holding frame having the engagement projection functions as a focus lens, the mechanical holding and the release of the mechanical holding can be achieved by the driver which is provided to move independently from another optical member for focus adjustment.

In addition to the above configuration, if the engagement hole has the opening area orthogonal to the optical axis direction, which decreases toward the bottom portion, in the transition from the electrical holding to the mechanical holding, the position gap between the engagement hole and the fixed projection as viewed in the plane orthogonal to the optical axis can be adjusted, and the appropriate engagement (mechanical holding) can be achieved.

In addition to the above configuration, if the engagement hole includes the four inclination faces each of which inclines at 45 degrees to the optical axis direction, the position gap between the fixed projection and the engagement hole can be further smoothly adjusted.

In addition to the above configuration, if the engagement hole includes a spherical shape, the position gap between the fixed projection and the engagement hole can be further smoothly adjusted.

In addition to the above configuration, the imaging device further includes the camera shake correction mechanism which moves the stage to an arbitrary position in the plane orthogonal to the optical axis by controlling an applied current, so as to correct camera shake by the electrical holding, and if the engagement projection and the engagement hole has the positional relationship in which the central position of the engagement projection as viewed in the optical direction conforms to the central position of the engagement hole as viewed in the optical axis direction when the stage is moved to the origin position in the electrical holding by the camera shake correction mechanism, the appropriate camera shake correction can be immediately performed by the camera shake correction mechanism.

If the imaging device having the housed state in which a plurality of optical members of the imaging optical system is housed by collapsing at least a part of the optical members and the shooting standby state in which at least a part of the optical members is moved on a subject side includes the stage configured to be movable along the plane orthogonal to the optical axis so as to move the imaging element which obtains the subject image by the shooting optical system in the plane, a plurality of optical member holding frames each of which is configured to hold each of the optical members, and the lens holding frame driver configured to drive each of the optical member holding frames, one of the optical member holding frames, which is moved in the optical axis direction in accordance with transition of the housed state and the shooting standby state, includes the engagement hole facing to the stage, and the stage includes the engagement projection which is engageable with the engagement hole by the movement of the optical member holding frame including the engagement hole in the optical axis direction, and the engagement projection and the engagement hole has a positional relationship in which the engagement projection engages with the engagement hole if each of the optical member holding frames is moved into the housed state by the lens holding frame driver and the engagement projection disengages from the engagement hole if the each of the optical member holding frames is moved into the shooting standby state by the lens holding frame driver, when the each of the optical member holding frame is moved into the housed state by the lens holding driver, the engagement projection engages with the engagement hole, so that the position of the stage can be fixed (mechanical holding). When the each of the optical member holding frames is moved into the shooting standby state by the lens holding frame driver, the engagement projection disengages from the engagement hole, so that the fixation of the position of the stage (mechanical holding) can be released. Accordingly, it is not necessary to mount a locking mechanism and an actuator for driving the locking mechanism; thus, the power consumption can be controlled without decreasing the freedom degree of the layout of the camera shake correction mechanism and the like and increasing the entire costs.

What is claimed is:

1. An imaging device having a housed state in which a plurality of optical members of a shooting optical system is housed by collapsing at least a part of the optical members and a shooting standby state in which at least a part of the optical members is moved on a subject side, comprising:
    a stage configured to be movable along a plane orthogonal to an optical axis so as to move an imaging element which obtains a subject image by the shooting optical system in the plane;
    a plurality of optical member holding frames each of which is configured to hold each of the optical members; and
    a lens holding frame driver configured to drive each of the optical member holding frames,
    the stage including an engagement hole facing to the shooting optical system, and
    one of the optical member holding frames, which is moved in an optical axis direction in accordance with transition of the housed state and the shooting standby state, including an engagement projection which is engageable with the engagement hole by the movement in the optical axis direction, wherein
    the engagement projection and the engagement hole have a positional relationship in which the engagement projection engages with the engagement hole if each of the optical member holding frames is moved into the housed state by the lens holding frame driver and the engagement projection disengages from the engagement hole if the each of the optical member holding frames is moved into the shooting standby state by the lens holding frame driver.

2. The imaging device according to claim 1, wherein the optical member holding frame having the engagement projection holds the optical member located on the side closest to the stage as viewed in the optical axis direction in the plurality of optical members of the shooting optical system.

3. The imaging device according to claim 2, wherein the optical member which is held in the optical member holding frame having the engagement projection functions as a focus lens.

4. The imaging device according to claim 1, wherein the engagement hole includes an opening area orthogonal to the optical axis direction, which decreases toward a bottom face.

5. The imaging device according to claim 4, wherein the engagement hole has four flat faces each of which inclines at 45 degrees relative to the optical axis direction.

6. The imaging device according to claim 4, wherein the engagement hole has a spherical shape.

7. The imaging device according to claim 1, further comprising a camera shake correction mechanism configured to move the stage to an arbitrary position in a plane orthogonal to the optical axis by controlling an applied current, so as to correct camera shake by electrical holding, wherein
    the engagement projection and the engagement hole have a positional relationship in which, a central position of the engagement projection as viewed in the optical direction conforms to a central position of the engagement hole as viewed in the optical axis direction if the stage is moved to an origin position in the electrical holding by the camera shake correction mechanism.

8. An imaging device having a housed state in which a plurality of optical members of a shooting optical system is housed by collapsing at least a part of the optical members and a shooting standby state in which at least a part of the optical members is moved on a subject side, comprising:
- a stage configured to be movable along a plane orthogonal to an optical axis so as to move an imaging element which obtains a subject image by the shooting optical system in the plane;
- a plurality of optical member holding frames each of which is configured to hold each of the optical members; and
- a lens holding frame driver configured to drive each of the optical member holding frames,
- one of the optical member holding frames, which is moved in an optical axis direction in accordance with transition of the housed state and the shooting standby state, including an engagement hole facing to the stage, and
- the stage including an engagement projection which is engageable with the engagement hole by the movement of the optical member holding frame including the engagement hole in the optical axis direction, wherein the engagement projection and the engagement hole have a positional relationship in which the engagement projection engages with the engagement hole if each of the optical member holding frames is moved into the housed state by the lens holding frame driver and the engagement projection disengages from the engagement hole if the each of the optical member holding frames is moved into the shooting standby state by the lens holding frame driver.

9. An electronic device comprising the imaging device according to claim 1.

* * * * *